(12) United States Patent
Yasugi et al.

(10) Patent No.: US 8,983,130 B2
(45) Date of Patent: Mar. 17, 2015

(54) POSITIONING INFORMATION FORMING DEVICE, DETECTION DEVICE, AND POSITIONING INFORMATION FORMING METHOD

(75) Inventors: Makoto Yasugi, Tokyo (JP); Hirofumi Nishimura, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 104 days.

(21) Appl. No.: 13/817,488

(22) PCT Filed: Jan. 11, 2012

(86) PCT No.: PCT/JP2012/000116
§ 371 (c)(1),
(2), (4) Date: Feb. 18, 2013

(87) PCT Pub. No.: WO2012/101967
PCT Pub. Date: Aug. 2, 2012

(65) Prior Publication Data
US 2013/0148855 A1    Jun. 13, 2013

(30) Foreign Application Priority Data

Jan. 25, 2011    (JP) ................................. 2011-013174

(51) Int. Cl.
*G06K 9/00* (2006.01)
*G06K 9/32* (2006.01)
(Continued)

(52) U.S. Cl.
CPC ............ *G06K 9/3241* (2013.01); *G01S 13/867* (2013.01); *G01S 13/931* (2013.01);
(Continued)

(58) Field of Classification Search
USPC .......... 382/103, 104, 243, 146; 342/174, 146, 342/70; 701/41; 348/159; 345/419
See application file for complete search history.

(56) References Cited

U.S. PATENT DOCUMENTS 7,042,389 B2 *   5/2006   Shirai .............................. 342/70
7,061,373 B2 *   6/2006   Takahashi ...................... 340/435
(Continued)

FOREIGN PATENT DOCUMENTS

CN    101178437 A    5/2008
JP    02-061581 A    3/1990
(Continued)

OTHER PUBLICATIONS

Mobile Mapping: An Emerging Technology for Spatial Data Acquisition; Rongxing Li; Sep. 1997 PE&RS.*
(Continued)

*Primary Examiner* — Bernard Krasnic
*Assistant Examiner* — Pinalben Patel
(74) *Attorney, Agent, or Firm* — Pearne & Gordon LLP

(57) ABSTRACT

Provided is a positioning information forming device which improves object detection accuracy. This device comprises a synthesis unit (103) which synthesizes camera distance map information and radar distance map information and generates "synthesized map information". This synthesized map information is used for object detection processing by a detection device (200). In this way it is possible to improve object detection accuracy by being able to detect objects based on information in which the camera distance map information and radar distance map information have been synthesized. In other words, by synthesizing the camera distance map information and radar distance map information, it is possible to remove unnecessary noise due to reflection from the ground and walls, etc. and therefore set object detection thresholds to low values. It is therefore possible to detect even objects the detection of which was judged to be impossible in the past.

12 Claims, 17 Drawing Sheets

(51) Int. Cl.
  *G01S 13/86* (2006.01)
  *G01S 13/93* (2006.01)
  *G03B 35/08* (2006.01)
  *G01C 3/18* (2006.01)
  *G01S 13/58* (2006.01)
  *G06T 7/00* (2006.01)
  *G06T 5/00* (2006.01)
  *G01S 13/89* (2006.01)

(52) U.S. Cl.
  CPC ............... *G03B 35/08* (2013.01); *G01C 3/18* (2013.01); *G01S 13/58* (2013.01); *G01S 13/89* (2013.01); *G06T 7/004* (2013.01); *G06T 2207/10021* (2013.01); *G06T 2207/10028* (2013.01); *G06T 2207/20221* (2013.01); *G06T 2207/30261* (2013.01); *G06T 5/002* (2013.01)
  USPC ........................................................ 382/103

(56) References Cited

U.S. PATENT DOCUMENTS

| | | | | |
|---|---|---|---|---|
| 7,623,681 | B2 * | 11/2009 | Miyahara | 382/104 |
| 7,822,571 | B2 * | 10/2010 | Kakinami | 702/104 |
| 8,264,542 | B2 * | 9/2012 | Lee et al. | 348/159 |
| 2006/0227041 | A1 * | 10/2006 | Okamoto | 342/174 |
| 2008/0106462 | A1 * | 5/2008 | Shiraishi | 342/146 |
| 2008/0306666 | A1 * | 12/2008 | Zeng et al. | 701/70 |
| 2009/0122136 | A1 * | 5/2009 | Shiraishi et al. | 348/135 |
| 2009/0292468 | A1 * | 11/2009 | Wu et al. | 701/301 |
| 2010/0191391 | A1 * | 7/2010 | Zeng | 701/1 |
| 2010/0254572 | A1 * | 10/2010 | Tener et al. | 382/103 |

FOREIGN PATENT DOCUMENTS

| | | |
|---|---|---|
| JP | 06-094836 A | 4/1994 |
| JP | 06-160516 A | 6/1994 |
| JP | 11-025278 A | 1/1999 |
| JP | 11-351862 A | 12/1999 |
| JP | 2001-296357 A | 10/2001 |
| JP | 2006-153773 A | 6/2006 |
| JP | 2008-116357 A | 5/2008 |
| JP | 2008-304344 A | 12/2008 |
| JP | 2008-309519 A | 12/2008 |

OTHER PUBLICATIONS

Object Tracking From Image Sequences Using Stereo Camera and Range Radar; Stelios Thomopoulos, Nillson; SPIE vol. 1198 Sensor Fusion II: Human and Machine Strategies (1989); Inforamtion Processing and Intelligent Systems (IPIS) Laboratory; Southern Illinoise University, IL.*

International Search Report for PCT/JP2012/000116 dated Feb. 21, 2012.

* cited by examiner

|  | SUBREGION A (PEDESTRIAN SUBREGION) | | SUBREGION B (VEHICLE SUBREGION) | |
| --- | --- | --- | --- | --- |
|  | LENGTH OF FILTER | WEIGHT OF FILTER | LENGTH OF FILTER | WEIGHT OF FILTER |
| SMOOTHING FILTER FOR RADAR DISTANCE MAP | SHORT | INCREASE | LONG | — |
| LEVEL ADJUSTING FILTER FOR CAMERA DISTANCE MAP | SHORT | — | LONG | INCREASE |

FIG. 15

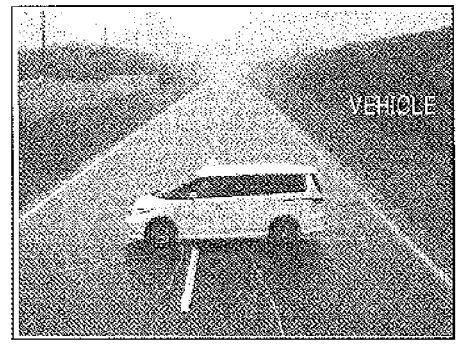 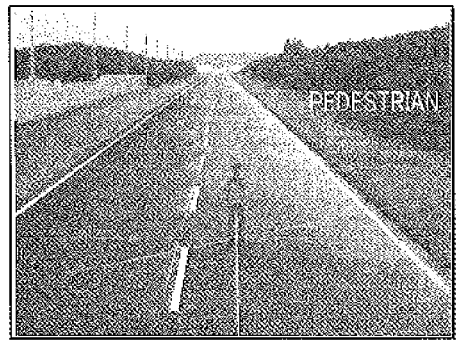
FIG. 17A  FIG. 17B
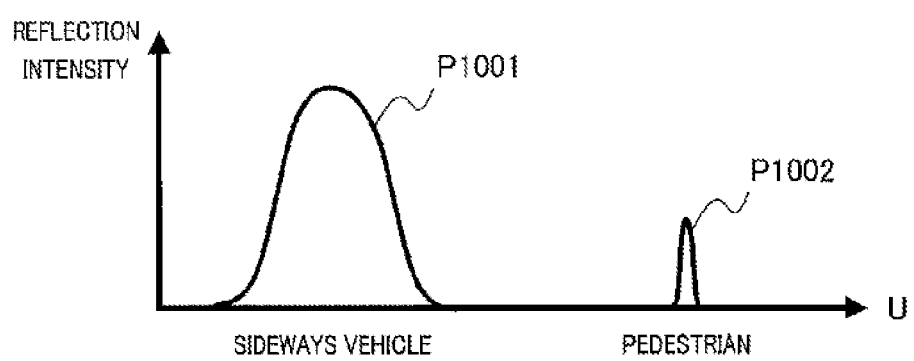
FIG. 17C

POSITIONING INFORMATION FORMING DEVICE, DETECTION DEVICE, AND POSITIONING INFORMATION FORMING METHOD

TECHNICAL FIELD

The present invention relates to a positioning information forming apparatus, a detection apparatus, and a positioning information forming method.

BACKGROUND ART

Object positioning detection apparatuses have been proposed, each of which includes a millimeter wave radar and a stereo camera. For example, a first object positioning detection apparatus detects a candidate object to be detected on the basis of camera positioning information calculated based on stereo images taken by a stereo camera. The object positioning detection apparatus then corrects the positioning information on the candidate object to be detected using the radar positioning information provided by the millimeter wave radar. A second object positioning detection apparatus detects the direction of the object to be detected, and then detects the object to be detected using only the direction of the object in the camera positioning information provided by the stereo camera.

For example, the object detection apparatus disclosed in PTL 1 has a similar scheme to that of the second object positioning detection apparatus mentioned above. Namely, the apparatus detects the direction of the object by the millimeter wave radar and then detects the object using only the camera positioning information overlapping with the detected angular direction.

In detail, in the traditional object detection method using a millimeter wave radar and a stereo camera, the object is detected by one of the millimeter wave camera and the stereo camera, and then the information provided by the other is supplementarily used.

CITATION LIST

Patent Literature

PTL 1
Patent Document 1: Japanese Patent Application Laid-Open No. 2001-296357

SUMMARY OF INVENTION

Technical Problem

Unfortunately, the traditional object detection method mentioned above is likely to fail to detect the object to be detected if the first detection accuracy is low, despite the use of the supplementary information. For example, the object detection apparatus disclosed in PTL 1 detects the object with the stereo camera only within an area where the millimeter wave radar can detect the object. If the object detection apparatus installed at a road shoulder for detecting vehicles as the object to be detected, is located diagonally behind a vehicle, the power intensity of the millimeter wave which is radiated from the object detection apparatus and reflected by the vehicle sometimes decreases than expected. In such a case, some millimeter wave radars fail to detect the presence of the vehicle, and cannot detect the vehicle even if a supplementary stereo camera is used.

An object of the present invention is to provide a positioning information forming apparatus, a detection apparatus and a positioning information forming method which have improved object detection accuracy.

Solution to Problem

An aspect of the present invention provides a positioning information forming apparatus which forms positioning information for a detection apparatus to detect an object on the basis of an image based on information detected by a radar and images taken by a stereo camera, the positioning information forming apparatus including a processing section to process radar distance map information which associates a coordinate group in the image plane of the image based on the information detected by the radar with distance information on each coordinate; a combination section to form combined map information by combining camera distance map information which associates the coordinate group in the image planes of the images taken by the stereo camera with distance information on each coordinate and the processed radar distance map information; and a coordinate transforming section disposed on the input stage of the processing section to transform a coordinate system of the radar distance map information input to the processing section to a reference coordinate system.

Another aspect of the present invention provides a positioning information forming apparatus which forms positioning information for a detection apparatus to detect an object on the basis of an image based on information detected by a radar and images taken by a stereo camera, the positioning information forming apparatus including, a processing section to process radar distance map information which associates a coordinate group in the image plane of the image based on the information detected by the radar with distance information on each coordinate; a combination section to form combined map information by combining camera map information which associates a coordinate group in an image planes taken by the stereo cameras with distance information on each coordinate and the processed radar distance map information, and a coordinate transforming section disposed on the output stage of the processing section and on the input stage of the combination section transforms a coordinate system of radar distance map information input in the processing section to a reference coordinate system.

An aspect of the present invention provides a positioning information forming method for forming positioning information for a detection apparatus to detect an object on the basis of an image based on information detected by a radar and images taken by a stereo camera, the positioning information forming method including processing radar distance map information which associates a coordinate group in an image plane of the image based on information detected by the radar with distance information on each coordinate; transforming a coordinate system of the radar distance map information to a reference coordinate system; and forming combined map information by combining camera distance map information which associates a group of coordinates in image planes of images taken by the stereo camera with distance information on each coordinate and the processed radar distance map information.

Advantageous Effects of Invention

The present invention provides a positioning information forming apparatus, a detection apparatus and a positioning information forming method which have improved object detection accuracy.

BRIEF DESCRIPTION OF DRAWINGS

FIG. 15 is a table illustrating information processes for subregions of the objects;

FIG. 17 is an illustration of reflection intensity characteristics obtained when the objects to be detected are a sideways vehicle and a pedestrian;

DESCRIPTION OF EMBODIMENTS

Embodiments of the present invention will now be described in detail with reference to accompanying drawings. In the following description, the same components are given the same number without duplicated description.

(Embodiment 1)

(Main Configuration of Positioning Information Forming Apparatus)

Figure 1:
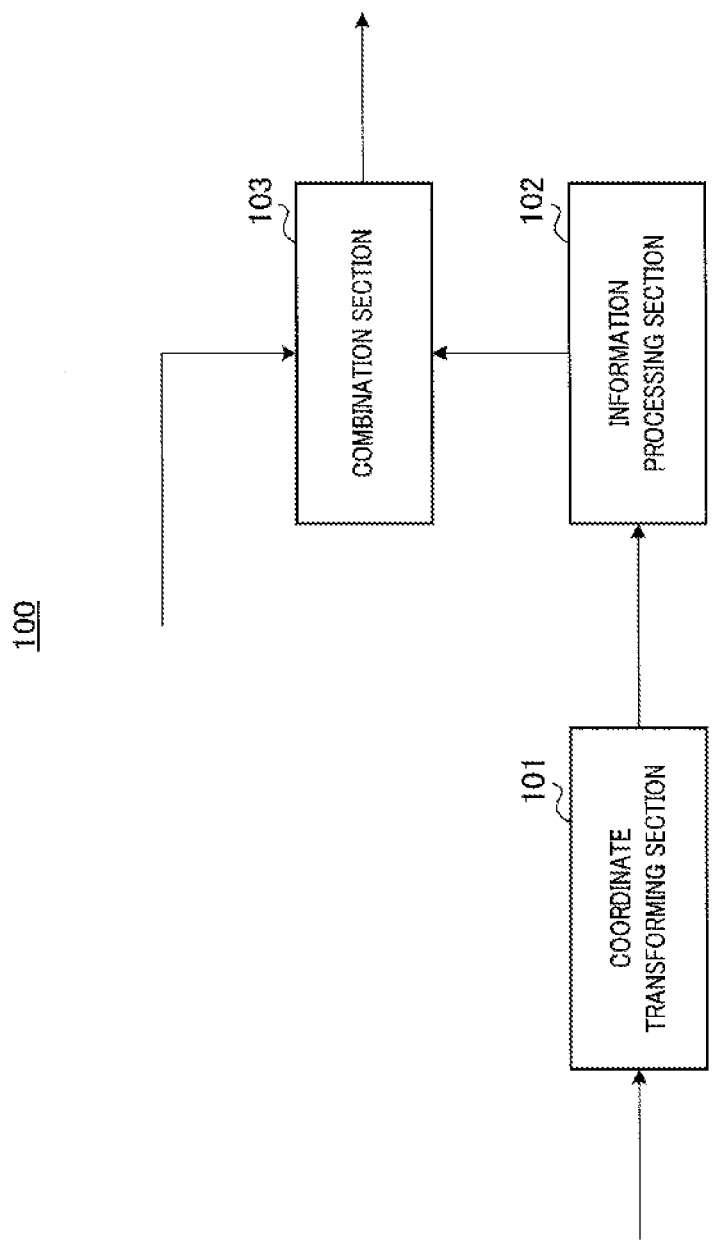
FIG. 1 is a block diagram illustrating the main configuration of a positioning information forming apparatus in accordance with Embodiment 1 of the present invention.

FIG. 1 illustrates the main configuration of positioning information forming apparatus 100 in accordance with Embodiment 1 of the present invention. Positioning information forming apparatus 100 receives "first distance map information" obtained by a first positioning system and "second distance map information" obtained by a second positioning system as input values. "Distance map information" is information associating a coordinate group in an image plane with "distance information" on each coordinate. The first positioning system in this embodiment includes a stereo camera. The first distance map information, therefore, is camera distance map information calculated based on stereo images taken by the stereo camera. "Distance information" in camera distance map information is, for example, a parallax value or a distance value. The second positioning, system includes a mil-limeter wave radar. The second distance map information, therefore, is radar distance map information calculated based on information detected by the millimeter wave radar. "Distance information" in radar distance map information is, for example, a distance value or reflection intensity.

In FIG. 1, positioning information forming apparatus 100 includes coordinate transforming section 101, information processing section 102, and a combination section 103.

Coordinate transforming section 101 conforms the coordinate system of radar distance map information to the "reference coordinate system" by coordinate transformation of radar distance map information. The "reference coordinate system" is used as a reference for combining distance map information input from a plurality of positioning systems in combination section 103 which will be described below. In Embodiment 1, the "reference coordinate system" is a coordinate system of camera distance map information.

Information processing section 102 smoothes radar distance map information. The smoothing leads to a moderate change in "distance information" among the radar distance map information.

Combination section 103 combines camera distance map information and the processed radar distance map information to generate "combined map information."

(Configuration of Detection Apparatus 200)

Figure 2:
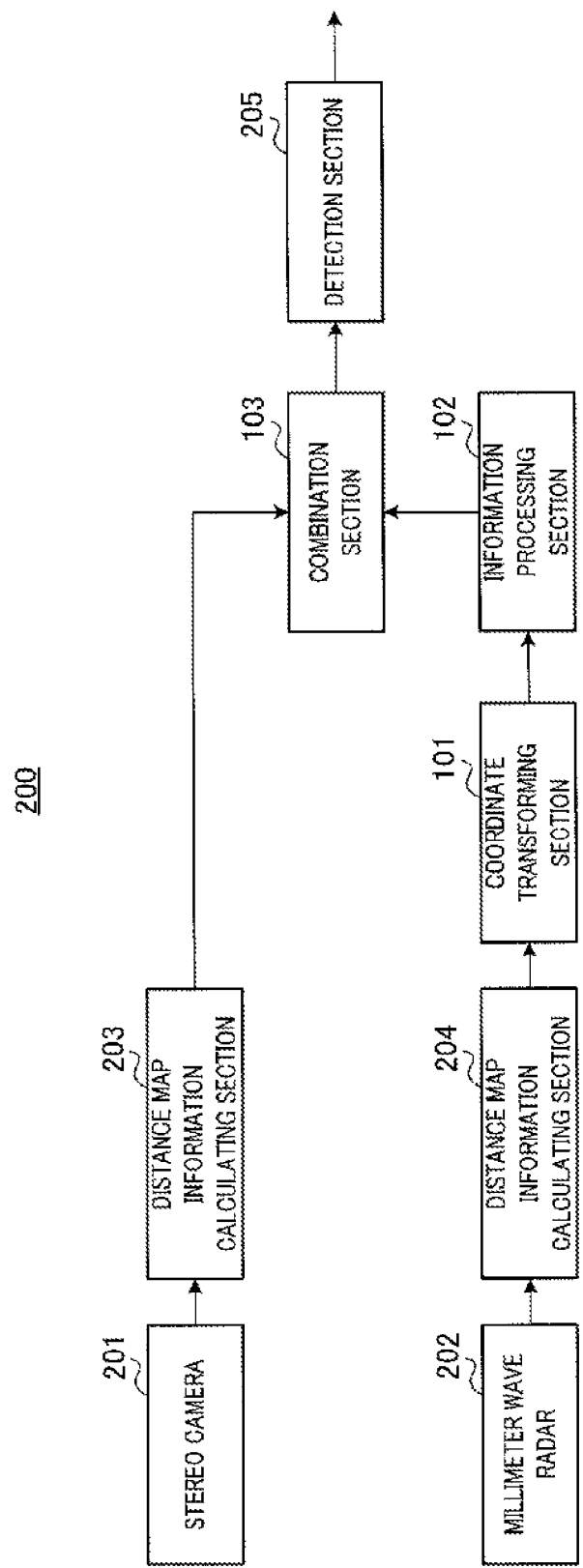
FIG. 2 is a block diagram illustrating the configuration of a detection apparatus in accordance with Embodiment 1 of the present invention.

FIG. 2 illustrates a configuration of a detection apparatus 200 in accordance with Embodiment 1 of the present invention. Detection apparatus 200 includes positioning information forming apparatus 100. In FIG. 2, Detection apparatus 200 includes coordinate transforming section 101, information processing section 102, combination section 103, stereo camera 201, millimeter wave radar 202, distance map information calculating section 203 and 204, and detection section 205. Stereo camera 201 and distance map information calculating section 203 configure a first positioning system, while millimeter wave radar 202 and distance map information calculating section 204 configure a second positioning system.

Stereo camera 201 includes a plurality of cameras and outputs camera images (namely, stereo images) taken by these cameras to distance map information calculating section 203.

Figure 3B:
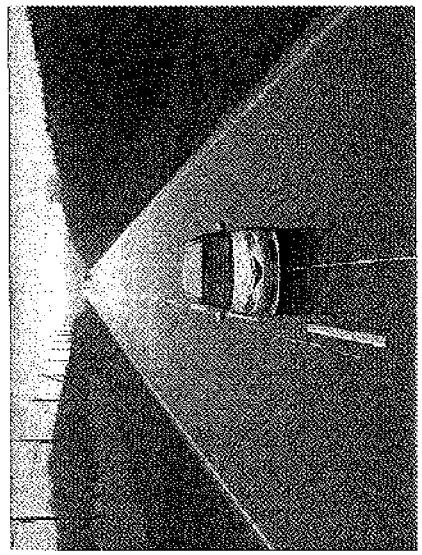
FIG. 3 illustrates stereo images.
Figure 3A:
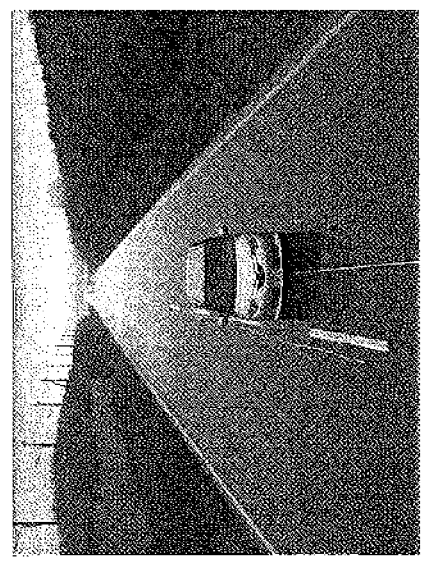

For example, stereo camera 201 consists of two cameras which are disposed in parallel at a distance of 20 cm. FIG. 3 illustrates images of a vehicle at a distance of 20 m from these cameras, the images being taken by these cameras. FIG. 3A illustrates an image taken by the camera on the left in the direction of shooting (namely, a left camera image), and FIG. 3B illustrates an image taken by the camera on the right in the direction of shooting (namely, a right camera image).

Distance map information calculating section 203 calculates camera distance map information on the basis of a stereo image output from stereo camera 201. Specifically, distance map information calculating section 203 calculates the separation distance between the object and the stereo camera 201 on the basis of the difference in the positions (namely, a parallax) of the same object which appears on the left and right camera images. Distance map information calculating section 203 calculates camera distance map information through calculation of the separation distances of all pixels making up the left and right camera images.

The separation distance between the object and the stereo camera 201 can be calculated from, for example, Equation 1:

(Equation 1)

$$Z = B\frac{f}{P_X d} \quad [1]$$

wherein, Z represents the distance [m] between the stereo camera and the object. B represents the camera distance [m], f represents the camera focal point distance [m], Px represents the length per one pixel [m/pixel] in a horizontal axis direction of the image and d represents the parallax [pixel].

More specifically, the parallax can be calculated, for example, in the following way. One of the left and right images is defined as a target image and the other as a reference image. A partial image (namely, a partial target image) having a predetermined size (for example, 4×4 pixels) is selected from the target image. A search range having a predetermined size (for example, about several tens of pixels) is selected from the reference image. Partial reference images having the same size as the partial target image are then selected in sequence by shifting the position of the partial reference image, and a partial reference image corresponding to the partial target image is identified by calculating the evaluation function on the basis of a brightness value of the partial target image and each partial reference image. The difference between the partial target image and the identified partial reference image corresponds to a parallax. Since the parallax is calculated in this way, a small change in brightness between the partial target image and the partial reference image would cause an unsatisfactory parallax. This indicates if a shooting surface of an object, for example, has few patterns, like a roof of a vehicle or a road surface, a parallax is barely obtained.

Figure 4:
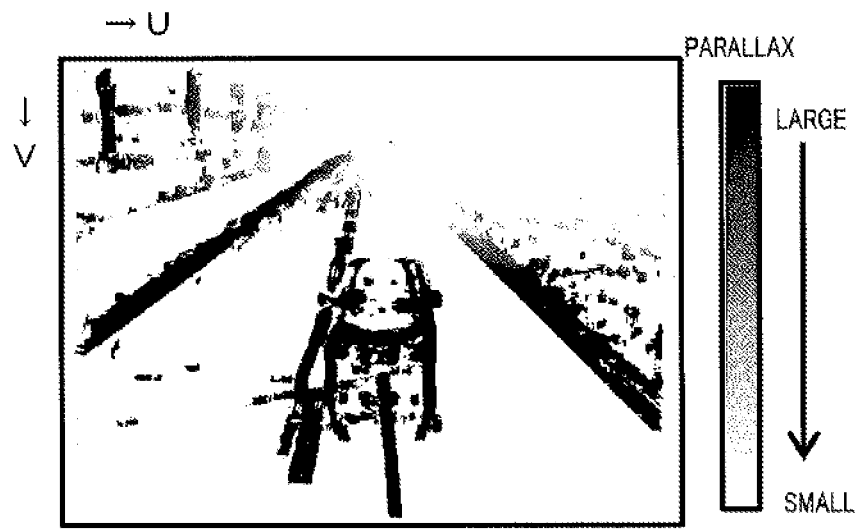
FIG. 4 illustrates exemplary camera distance map information.

FIG. 4 illustrates exemplary camera distance map information. The camera distance map information in FIG. 4 is obtained from the right and left camera images illustrated in FIG. 3. In FIG. 4, the parallax value is used as "distance information." The magnitude of the parallax is represented by the shade and the area where a parallax cannot be obtained is described in white due to a zero parallax value. Symbols U and V shown in FIG. 4 represent image plane coordinates which are differentiated from the real space coordinates (X, Y, Z). Each coordinate in the image plane coordinate system corresponds to a pixel where the lateral direction of the image is defined as U coordinates and the longitudinal direction as V coordinates.

Back to FIG. 2, millimeter wave radar 202 radiates millimeter waves and detects the reflected millimeter waves. Millimeter wave radar 202, then, outputs the results of detection to distance map information calculating section 204.

Millimeter wave radar 202 is, for example, of a FMCW scheme which includes an antenna capable of outputting waves having a narrow beam width. Millimeter wave radar 202 receives the reflected waves by mechanically rotating the antenna. Incidentally, the FMCW scheme can acquire the distance and direction from millimeter wave radar 202 to an object, the travelling speed of an object, and reflection intensity from the object.

Direction map information calculating section 204 calculates radar distance map information on the basis of the results of detection received from millimeter wave radar 702.

Figure 5:
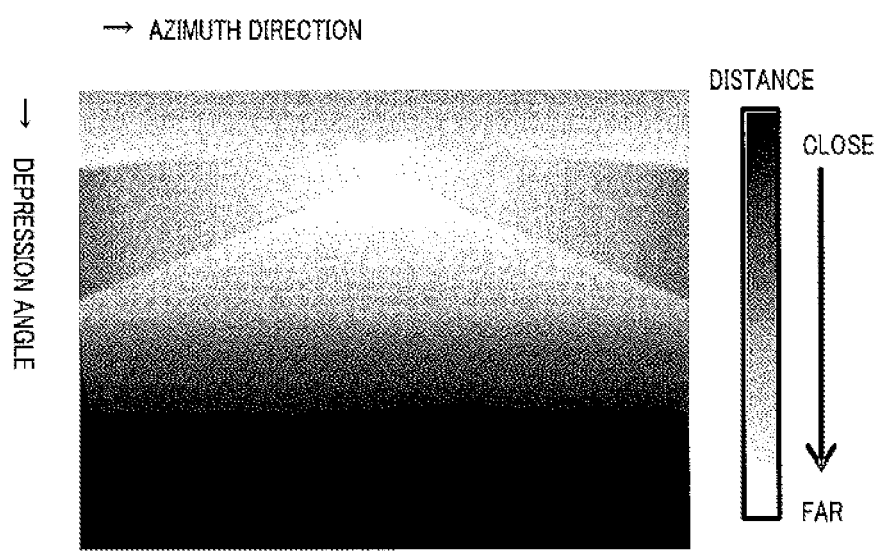
FIG. 5 illustrates exemplary radar distance map information.

FIG. 5 illustrates exemplary radar distance map information. In FIG. 5, a distance value is used as "distance information". The magnitude of the distance is represented by the shade. In FIG. 5, the image plane coordinate system has the azimuth direction of millimeter wave radar 202 and the depression angle orthogonal to the azimuth direction.

Back to FIG. 2, coordinate transforming section 101 transforms the coordinates of radar distance map information so that the camera distance map information and the radar distance map information have the same coordinate system.

Information processing section 102 smoothes the radar distance map information.

Combination section 103 generates "combined map information" by combining the camera distance map information and the processed radar distance map information.

Detection section 205 detects an object taken by stereo camera 201 on the basis of the "combined map information."

(Operation of Detection Apparatus 200)

The operation of detection apparatus 200 having the above-mentioned configuration will now be explained with particular emphasis on a coordinate transforming process, an information process, a distance map information combination process, and a detection process.

(Coordinate Transforming Process)

Coordinate transforming section 101 transforms the coordinates of the radar distance map information so that the camera distance map information and the radar distance map information have the same coordinate system. Specifically, coordinate transforming section 101 transforms the coordinates such that the radar distance map information represented by the coordinate system having orthogonal axes of the azimuth direction and the depression angle of millimeter wave radar 202 is represented by an image plane coordinate system (U, V). The coordinate is transformed using, for example. Equation 2.

(Equation 2)

$$\begin{pmatrix} u \\ v \end{pmatrix} = f\begin{pmatrix} \tan\theta \\ \tan\varphi \end{pmatrix} \quad [2]$$

wherein, f represents the focal distance of the stereo camera, and θ and φ represents the azimuth angle and the depression angle, respectively, of the millimeter wave radar.

(Information Processes)

Information processing section 102 smoothes the radar distance map information. Specifically, information processing section 102 smoothes at least one of the azimuth angle and the depression angle of the radar distance map information. The smoothing leads to a moderate change in reflection intensity of the azimuth angle or the depression angle. Information processing section 102 smoothes the radar distance map information after the coordinate transformation in coordinate transforming section 101.

The smoothing is performed using, for example, a smoothing filter represented by Equation 3, resulting in smoothing the distances of all the coordinates included in the radar distance map information.

(Equation 3)

$$\begin{bmatrix} 1/16 & 2/16 & 1/16 \\ 2/16 & 4/16 & 2/16 \\ 1/16 & 2/16 & 1/16 \end{bmatrix} \quad [3]$$

A millimeter wave radar generally has the following positioning characteristics: the distance to the object can be measured with high accuracy compared with the positioning information of a stereo camera while the boundary of the object in the azimuth angle and the depression angle cannot be readily determined due to a technical challenge to narrow the width of the antenna beam. The above-mentioned smoothing of the radar distance map information eliminates information corresponding to negative characteristics, leading to obtaining radar distance map information rich in information corresponding to positive characteristics.

(Combination Process of Distance Map Information)

Combination section 103 transforms the "distance information" (namely, distance value or reflection intensity) associated with each coordinate in the processed radar distance map information so that this distant information coincides with the "distance information" (namely, a parallax value or a distance value) associated with each coordinate in the camera distance map information. For example, if each coordinate is associated with a parallax value in the camera distance map information, combination section 103 transforms the "distance information" (namely, a distance value or reflection intensity) to a parallax value. In other words, combination section 103 optionally conforms the type of "distance information" between the radar distance map information and the camera distance map information.

Combination section 103 combines the camera distance map information and the radar distance map information by calculating the geometric means of the "distance information" of the corresponding coordinate between the radar distance map information and the camera distance map information, thereby generating the "combined map information."

(Object Detection Process)

Detection section 205 detects the object taken by stereo camera 201 based on the "combined map information." For example, if the "combined map information" is generated by a parallax distribution in image plane coordinates (U, V), the coordinates having a parallax similar to that of distribution as an object can be detected from the parallax distribution that has undergone coordinate transformation such that the V axis of the "combined map information" is vertical to the ground based on the installation conditions of the stereo camera (for example, installation height and angle). Explanation on conventional methods for detecting an object from the parallax distribution is omitted. The results of the detection may be superimposed on the right image (or the left image) to be output to a display (not illustrated) or to controllers such as a traffic signal controller for public use.

In Embodiment 1, combination section 103 in positioning information forming apparatus 100 combines the camera distance map information and the radar distance map information to generate "combined map information." The combined map information is used during an object detection process in detection apparatus 200.

Based on the combined information of the camera distance map information and the radar distance map information, an object can be detected at improved accuracy. More specifically, the elimination of unwanted noise reflection from the ground or walls can be expected, which allows setting a lower object detection threshold. Thus, it is possible to detect an object conventionally judged as being not detectable.

Combination section 103 combines the camera distance map information and the radar distance map information by calculating the geometric means of the "distance information" of the corresponding coordinate between the radar distance map information and the camera distance map information.

This combination facilitates the recognition of the boundary of an object due to values remaining only in coordinates yielding parallax in the camera distance map information.

The coordinate transformation of radar map information is performed prior to the information processes. Alternatively, the coordinate transformation may be performed after the information processes and prior to a combination process. Consequently, coordinate transforming section 101 may be disposed on the output stage of information processing section 102 and the input stage of combination section 103.

(Embodiment 2)

(Configuration of Detection Apparatus 300)

Figure 6:
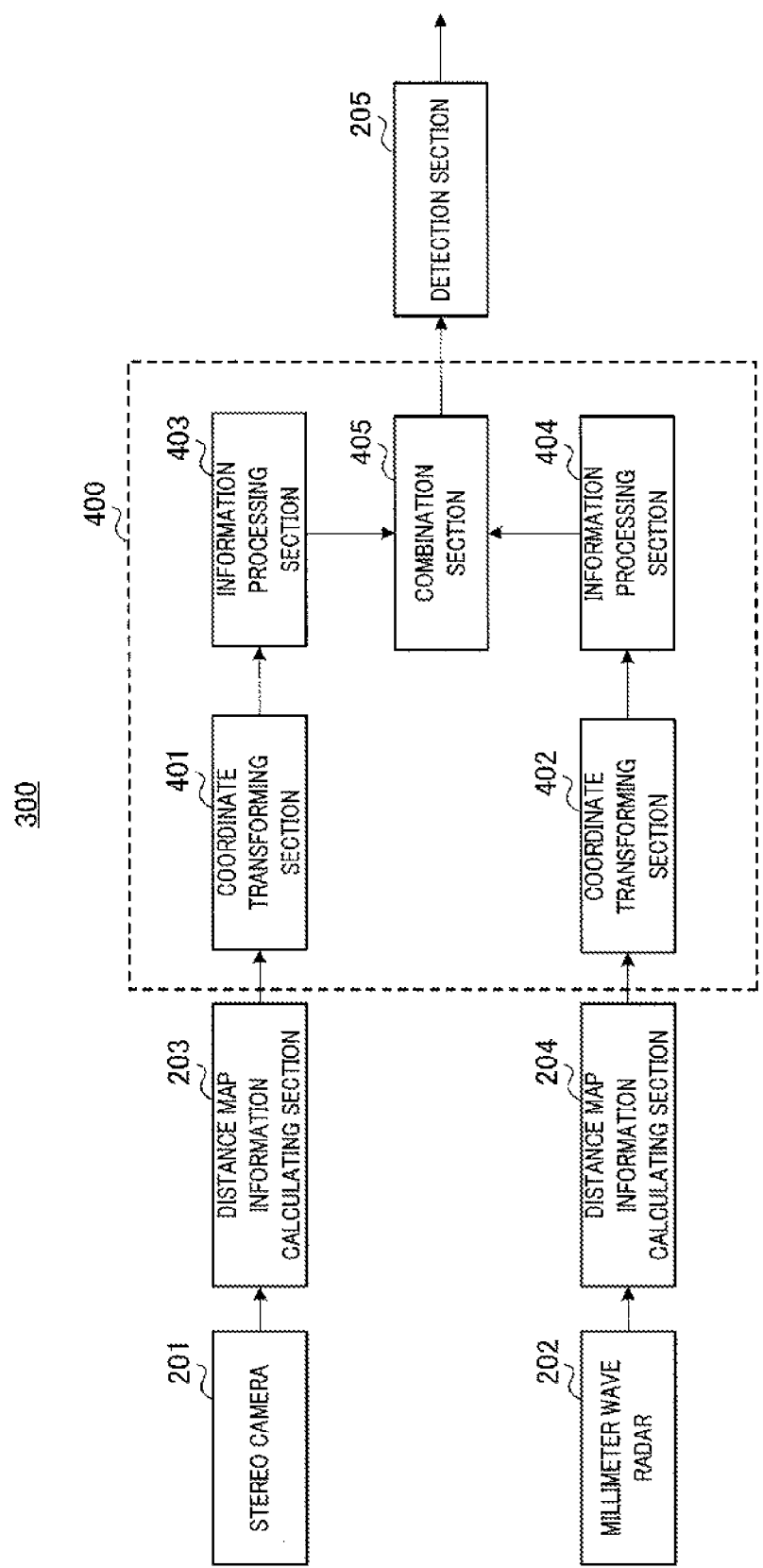
FIG. 6 illustrates the configuration of a detection apparatus in accordance with Embodiment 2 of the present invention.

FIG. 6 illustrates the configuration of detection apparatus 300 in accordance with Embodiment 2 of the present invention. Detection apparatus 300 includes positioning information forming apparatus 400.

In FIG. 6, positioning information forming apparatus 400 includes coordinate transforming section 401 and 402, information processing section 403 and 404, and combination section 405.

Figure 7:
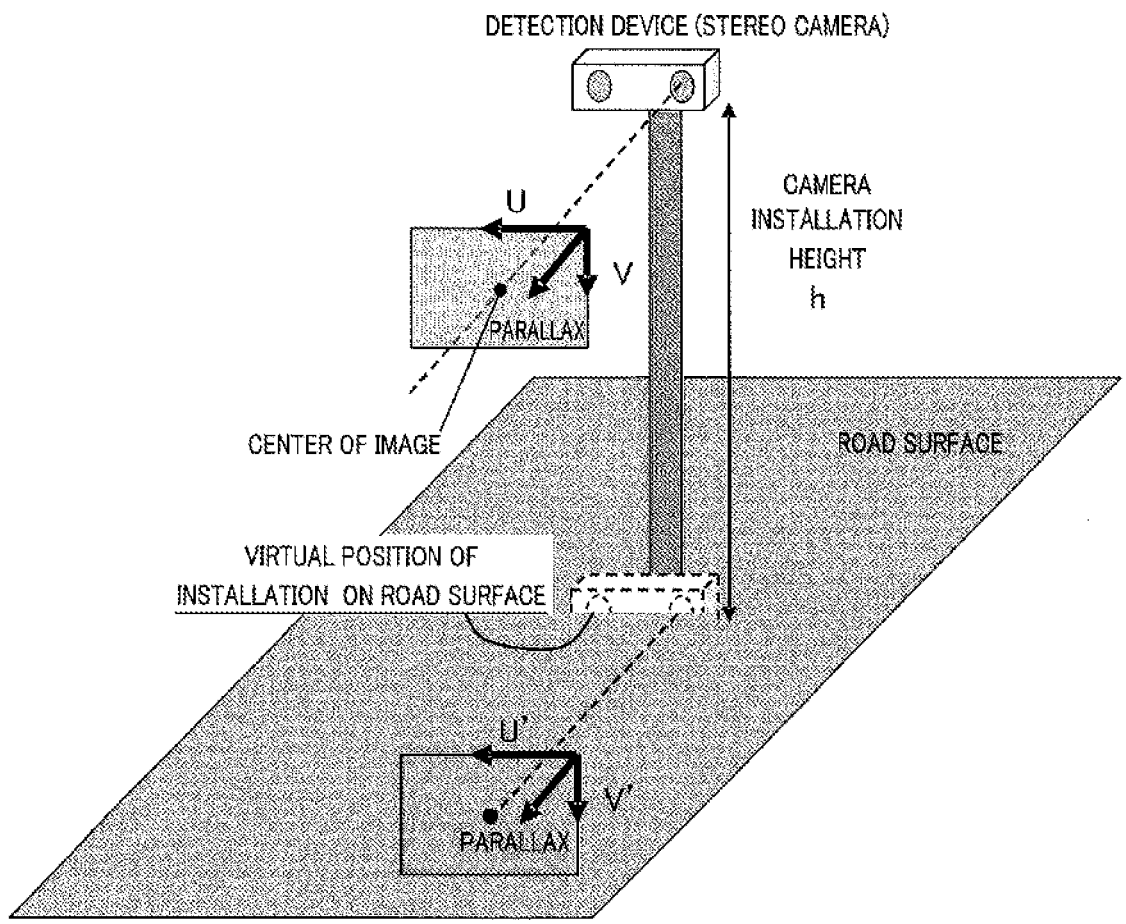
FIG. 7 illustrates an image plane coordinate system (U', V') of a virtual position of the detection apparatus installed on the road surface.

Coordinate transforming section 401 transforms the coordinates of the camera distance map information to conforms the coordinate system of the camera distance map information to the "reference coordinate system". The "reference coordinate system" used in coordinate transforming section 401 is defined by the parallax and the coordinate axis U' of the image plane coordinate system (U', V') of a virtual position of detection apparatus 300 installed on the road surface. FIG. 7 illustrates the image plane coordinate system (U', V') of a virtual position of detection apparatus 300 installed on the road surface.

More specifically, coordinate transforming section 401 transforms the coordinates of the camera distance map information through two steps. Details will be described later.

Coordinate transforming section 402 transforms the coordinates of the radar distance map information to conform the coordinate system of the radar distance map information to a "reference coordinate system". The "reference coordinate system" used in coordinate transforming section 402 is also defined by the parallax and the coordinate axis U' of the image plane coordinate system (U', V') of a virtual position of detection apparatus 300 installed on the road surface.

More specifically, coordinate transforming section 402 transforms the coordinates of the radar distance map information through two steps. Details will be described later.

Information processing section 403 performs the smoothing, level adjustment, and normalization of the camera distance map information after the coordinate transformation in coordinate transforming section 401.

Figure 8:
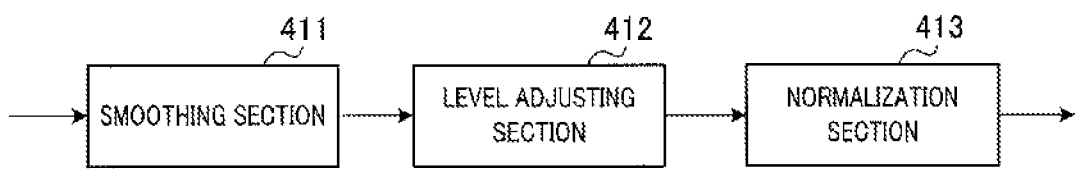
FIG. 8 is a block diagram illustrating a configuration of an information processing section.

FIG. 8 illustrates information processing section 403 including smoothing section 411, level adjusting section 412, and normalization section 413.

Smoothing section 411 smoothes the camera distance map information after the coordinate transformation in coordinate transforming section 401. Smoothing section 411 performs smoothing only in the parallax-axis direction. Smoothing section 411 applies a smoothing filter to the parallax-axis direction in any U' coordinate and smoothes the camera distance map information by the sequential shift of the U' coordinate.

Level adjusting section 412 adjusts the level of the camera distance map information by applying a level adjusting filter to the smoothed camera distance map information.

Normalization section 413 normalizes individual level values associated with the (U', parallax) coordinate group included in the level-adjusted camera distance map information using the maximum value among these level values.

Information processing section 404 performs the smoothing, level adjustment, and normalization of the radar distance map information after the coordinate transformation in coordinate transforming section 401.

Figure 9:
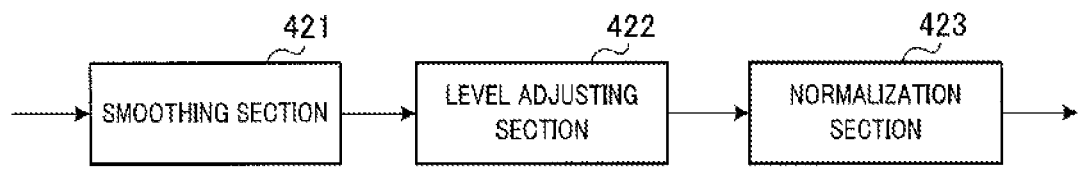
FIG. 9 is a block diagram illustrating a configuration of an information processing section.

FIG. 9 illustrates information processing section 404 including smoothing section 421, level adjusting section 422, and normalization section 423.

Smoothing section 421 smoothes the radar distance map information after the coordinate transformation in coordinate transforming section 402. Smoothing section 421 performs smoothing only in the U'-axis direction. Smoothing section 421 applies a smoothing filter to the U'-axis direction in any parallax coordinate and smoothes the radar distance map information by the sequential shift of the parallax coordinate.

Level adjusting section 422 adjusts the level of radar distance map information by applying a level adjusting filter to the smoothed radar distance map information.

Normalization section 423 normalizes individual level values associated with the (U', parallax) coordinate group included in the level-adjusted camera distance map information using the maximum value among these level values.

Combination section 405 combines the processed camera distance map information and processed radar distance map information to generate "combined map information."

(Operation of Detection Apparatus 300)

The operation of detection apparatus 300 having the above-mentioned configuration will be explained with particular emphasis on the operation of positioning information forming apparatus 400.

(Coordinate Transforming Process 1)

Coordinate transforming section 401 transforms the coordinates of the camera distance map information to conform the coordinate system of the camera distance map information to a "reference coordinate system". The "reference coordinate system" used in coordinate transforming section 401 is defined by the parallax and the coordinate axis U' of the image plane coordinate system (U', V') of a virtual position of detection apparatus 300 installed on the road surface.

More specifically, coordinate transforming section 401 transforms the coordinates of camera distance map information through the following two steps.

(1) Coordinate transforming section 401 projects the camera distance map information in the image plane coordinates (U, V) (see FIG. 10A), onto image plane coordinates (U', V'), to perform the coordinate transformation, where the camera distance map information is obtained using images taken from the installation position of detection apparatus 300.

In detail, the vector at a coordinate point before coordinate transformation $u\char`^=(u, v, 1, d)$ and the vector at a coordinate point after the coordinate transformation $u\char`^'=(u', v', 1, d')$ leads to the relation $u\char`^'=S^{-1} DSu\char`^$, where D represents the transformation matrix including installation parameters of a stereo camera (installation height, rotation angle) and S represents the matrix of camera correction parameters (for example, camera distance, rotation angle).

Figure 10B:
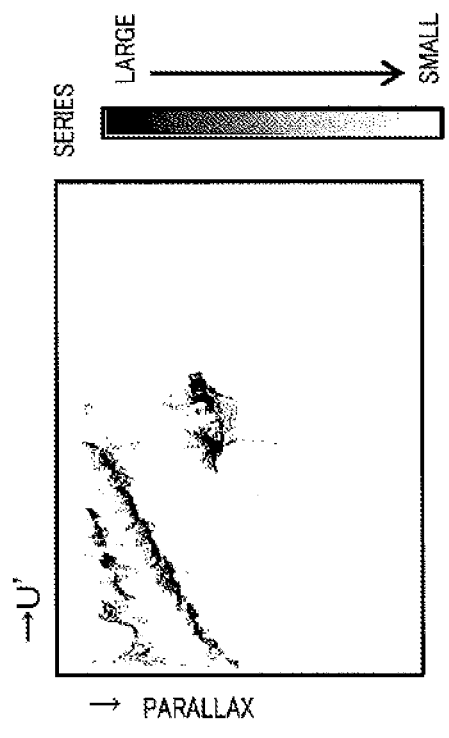
FIG. 10 is an illustration of a coordinate transforming process.
Figure 10A:
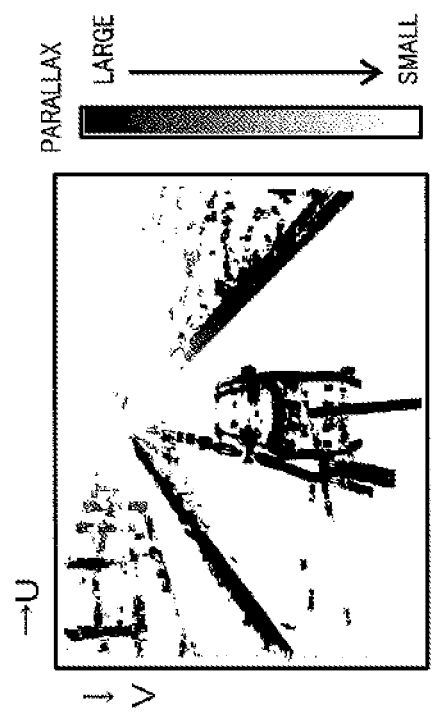

(2) Coordinate transforming section 401 calculates the parallax histogram within a range of the V' coordinate in the V' direction at each U' coordinate on the basis of the camera distance map information of an image plane coordinate system (U'', V'). Coordinate transforming section 401 calculates the parallax histogram by limiting the range of the V' coordinate to parts corresponding images above the road surface. The camera distance map information is thereby transformed into the "reference coordinate system." FIG. 10B illustrates exemplary camera distance map information after the coordinate transformation into the "reference coordinate system".

Using the parallax d (u', v') in the (u', v') coordinates and the series N (u', d) in the (u', d) coordinates, the transformation from d(u', v') to N (u', d) is represented by the following equation:

$$\text{for}(i=0; i<n; i++)\{\text{for}(j=0; j<m; j++)\{N(i,d(i,j))++;\}\}$$

where, n and m represent the ranges of the U' coordinates and the V' coordinates, respectively.

(Coordinate Transforming Process 2)

Coordinate transforming section 402 transforms the coordinates of the radar distance map information to conform the coordinate system of radar distance map information to the "reference coordinate system", The "reference coordinate system" used in coordinate transforming section 402 is also defined by the parallax and the coordinate axis U' of the image plane coordinate system (U', V') of a virtual position of detection apparatus 300 installed on the road surface.

More specifically, coordinate transforming section 402 transforms the coordinates of radar distance map information through the following two steps.

Figure 11B:
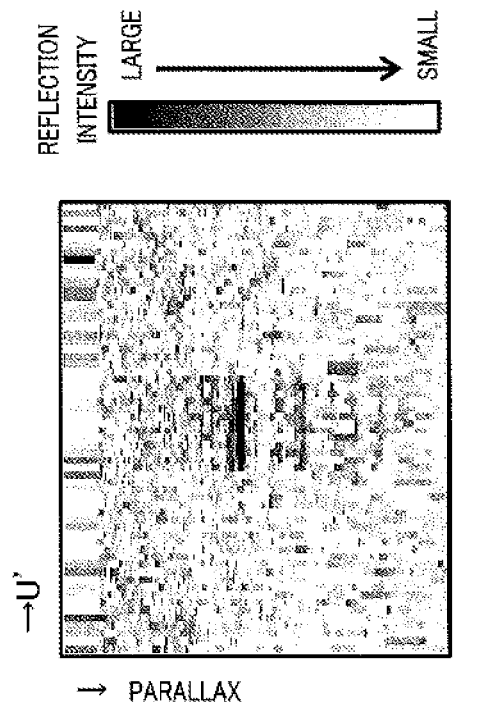
FIG. 11 is an illustration of a coordinate transforming process.
Figure 11A:
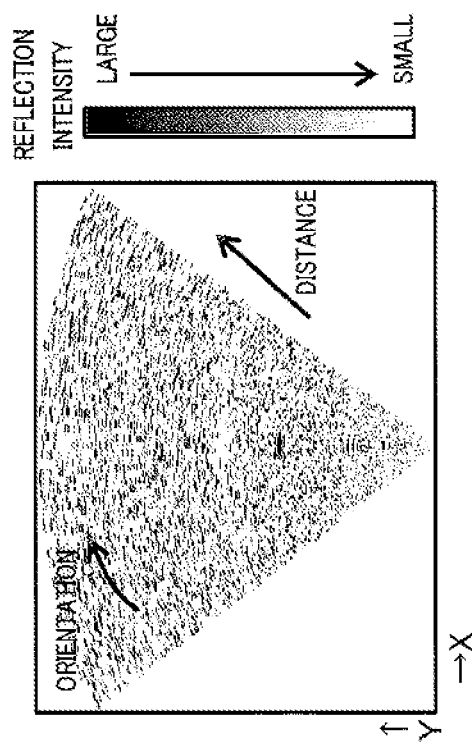

(1) Coordinate transforming section 402 projects the radar distance map information onto a plane (including an installation plane of detection apparatus 300) parallel to the installation plane of detection apparatus 300, to perform the coordinate transformation, where the radar distance map information associates each direction (namely, a direction defined by a pair of the azimuth angle and the depression angle) with the "distance information" of each direction FIG. 11A illustrates exemplary radar distance map information after the coordinate transformation.

(2) Coordinate transforming 402 calculates the reflection intensity distribution in each U' and the parallax coordinates on the basis of the radar distance map information projected onto a plane parallel to the installation plane of detection apparatus 300. The radar distance map information is thereby transformed into the "reference coordinate system." FIG. 11B illustrates exemplary radar distance map information after the coordinate transformation.

Supposing that the installation position and angle of stereo camera 201 conforms to those of millimeter wave radar 202, coordinate transforming section 402 calculates the reflection density distribution by the following equation using the camera correction parameter series S.

$$p\char`^'=S^{-1}p\char`^$$

wherein, the vector $p\char`^=(x, 0, z, 1)$ represents the coordinates (x, z) of a plane parallel to the installation plane of detection apparatus 300, and the vector $p\char`^'=(u', 0, 1, d)$ represents the coordinates (u', d) in a plane defined by U' and the parallax.

(Information Processes 1)

Information processing section 403 performs the smoothing, level adjustment, and normalization of the camera distance map information after the coordinate transformation in coordinate transforming section 401.

(Smoothing)

Figure 12A:
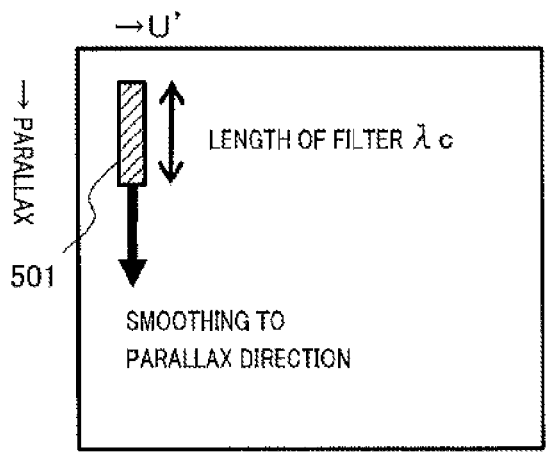
FIG. 12 is an illustration of a smoothing process.
Figure 12B:
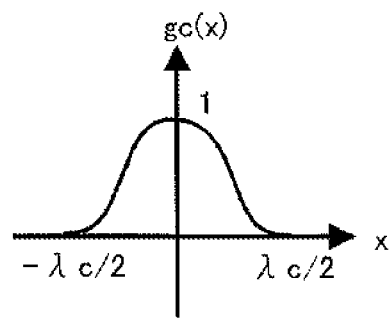

Smoothing section 411 smoothes the camera distance map information after the coordinate transformation in coordinate transforming section 401. Smoothing section 411 performs smoothing only in the parallax-axis direction. Smoothing section 411, as illustrated in FIG. 12A, smoothes the entire camera distance map information by applying a smoothing filter to the parallax-axis direction in any U' coordinate, and then sequential shifting of the filter to the next U' coordinate. FIG. 12B illustrates an exemplary smoothing filter used.

Consequently, smoothing only in the parallax-axis direction can reduce negative characteristics of the camera distance map information (namely, less accurate distance information than that of the radar distance map information), while enhances positive characteristics (namely, better recognition of the boundary of an object in the azimuth direction than that of the radar distance map information).

Specifically, as is illustrated in FIG. 12A, multiplying a smoothing filter 501 having a given length of the filter by the parallax value data sequence in each U' coordinate leads to a moderate change in series of the parallax-axis direction in the camera distance map information.

Smoothing filter 501 used is the Hanning function, which is represented by the following equation:

(Equation 4)

$$g_c(x) = 0.5 + 0.5\cos\frac{2\pi}{\lambda_c}x \quad \left(-\frac{\lambda_c}{2} \le x \le \frac{\lambda_c}{2}\right) \quad [4]$$
$$g_c(x) = 0 \quad \left(x < -\frac{\lambda_c}{2}, \frac{\lambda_c}{2} < x\right)$$

where $\lambda_c$ represents the length of the filter.

FIG. 12B illustrates the shape of Equation 4.

Equation 5 holds provided that coordinate values are N (u', d) and N' (u', d) before and after, respectively, the smoothing.

(Equation 5)

$$N(u', d) = \sum_{x} g_c(x-d) \cdot N(u', x) \quad [5]$$

(Level Adjustment)

Level adjusting section 412 multiplies the smoothed camera distance map information by a level adjusting filter to adjust the levels of the camera distance map information. The level adjusting filter used is characterized by the increase of the coordinate values with the decrease of the parallax. Specifically, as is illustrated in FIG. 13A, the level adjusting filter has a shape indicating a monotonous decrease of the level values (namely, weight) with the increase of the parallax.

The purpose of the level adjustment is to adjust the levels of the series corresponding to the parallaxes of the individual portions of the same object, because the series corresponding to the parallaxes of portions far from stereo camera 201 is smaller than that of closer portions.

Figure 13B:
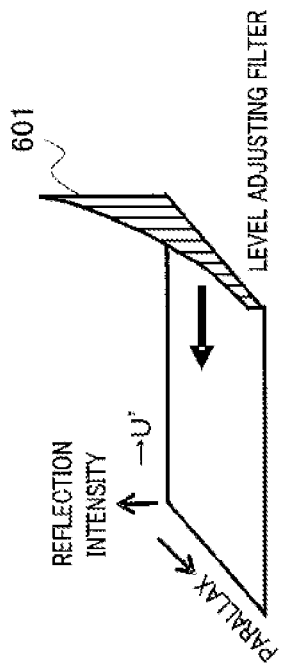
FIG. 13 is an illustration of a level adjusting process.
Figure 13A:
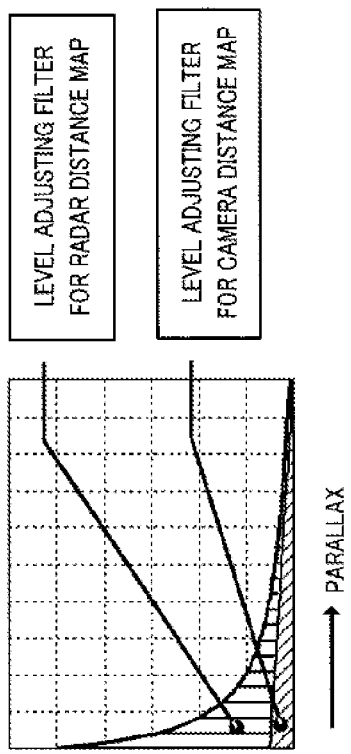

As is illustrated in FIG. 13A, the level adjusting filter used in level adjusting section 412 and the level adjusting filter used in level adjusting section 422 have different shapes. Also in the radar distance map information, the reflection intensity corresponding to the parallaxes of portions far from millimeter wave radar 202 is smaller than that of closer portions of the same object. The camera distance map information and the radar distance map information however have different reduction rates; hence, level adjustments of the camera distance map information and the radar distance map information using respective level adjusting filters with different shapes can adjust the relative level between the camera distance map information and the radar distance map information.

(Normalization)

Normalization section 413 performs normalization by dividing the individual level values associated with the (U', parallax) ordinate group included in the level-adjusted camera distance map information by the maximum value among these level values.

(Information Processes 2)

Information processing section 404 performs the smoothing, level adjustment, and normalization of the radar distance map information after the coordinate transformation in coordinate transforming section 402.

(Smoothing)

Figure 12C:
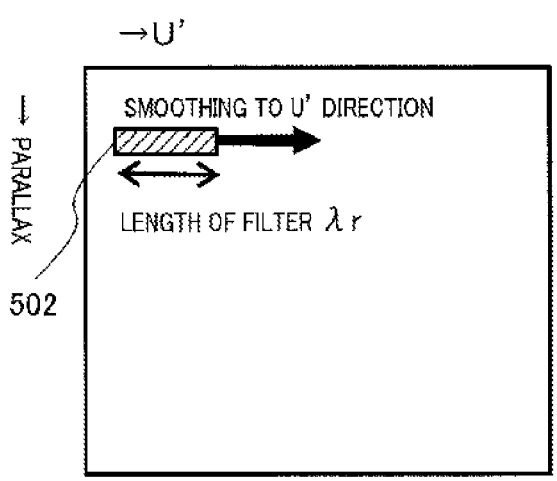
Figure 12D:
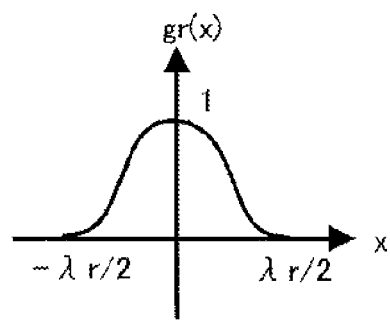

Smoothing section 421 smoothes the radar distance map information after the coordinate transformation in coordinate transforming section 402. Smoothing section 421 performs smoothing only in the U'-axis direction. Smoothing section 421, as illustrated in FIG. 12C, smoothes the entire radar distance map information by applying a smoothing filter to the U'-axis direction in any parallax coordinate, and then sequential shifting of the filter to the next parallax coordinate. FIG. 12D illustrates an exemplary smoothing filter used.

Consequently, smoothing only in the U'-axis direction can reduce negative characteristics of the radar distance map information (namely, less accurate recognition of the boundary of an object in the azimuth direction than that of the camera distance map information), while enhancing positive characteristics (namely, more accurate distance information than that of the camera distance map information).

Specifically, as is illustrated in FIG. 12C, multiplying a smoothing filter 502 having a given length of the filter by the U' data sequence in each parallax coordinate leads to a moderate change in reflection intensity of the U'-axis direction in the radar distance map information.

Exemplary smoothing filter 502 used is the Hanning function, which is represented by the following equation:

(Equation 6)

$$g_r(x) = 0.5 + 0.5\cos\frac{2\pi}{\lambda_r}x \quad \left(-\frac{\lambda_r}{2} \le x \le \frac{\lambda_r}{2}\right) \quad [6]$$
$$g_r(x) = 0 \quad \left(x < -\frac{\lambda_r}{2}, \frac{\lambda_r}{2} < x\right)$$

where $\lambda r$ represents the length of the filter.

FIG. 12D illustrates the shape of Equation 6.

Equation 7 holds provided that coordinate values are P (u', d) and P' (u', d) before and after, respectively, the smoothing.

(Equation 7)

$$P(u', d) = \sum_{x} g_r(x-u') \cdot N(x, d) \quad [7]$$

(Level Adjustment)

Level adjusting section 422 applies a level adjusting filter to the smoothed radar distance map information to adjust the levels of the radar distance map information. Level adjusting section 422, as illustrated in FIG. 13B, multiplies level adjusting filter 601 by the radar distance map information while the multiplied level adjusting filter 601 is sequentially shifted in the U'-axis direction, thereby adjusting the level of the entire radar distance map information. The level adjusting filter used is characterized by the increase of the coordinate values with the decrease of the parallax. Specifically, as is illustrated in FIG. 13A, the level adjusting filter has a shape indicating a monotonous decrease of the level values (namely, weight) with the increase of the parallax.

The purpose of the level adjustment is to adjust the levels of the reflection intensity corresponding to the parallaxes of the individual portions of the same object, because the reflection intensity corresponding to the parallaxes of portions far from millimeter wave radar 202 is smaller than that of closer portions.

(Normalization)

Normalization section 423 performs normalization by dividing the individual level values associated with the (U', parallax) coordinate group included in the radar-adjusted camera distance map information by the maximum value among these level values.

(Combination Process)

Combination section 405 combines the processed camera distance map information and the processed radar distance map information to generate "combined map information." Specifically, combination section 405 generates "combined map information" by multiplying the values of the processed camera distance map information by the corresponding values of the processed radar distance map information, a pair of the values being associated with an identical coordinate.

In Embodiment 2, in positioning information forming apparatus 400, coordinate transforming section 401 transforms the coordinates of the camera distance map information to conform the coordinate system of the camera distance map information to a "reference coordinate system". Coordinate transforming section 402 transforms the coordinates of the radar distance map information to conform the coordinate system of radar distance map information to the "reference coordinate system". The "reference coordinate system" is defined by the parallax and the coordinate axis U' of the image plane coordinate system (U', V') of a virtual position of detection apparatus 300 installed on the road surface.

Information processing section 403 smoothes the camera distance map information after the coordinate transformation in coordinate transforming section 401 only in the parallax-axis direction. Information processing section 404 smoothes the radar distance map information after the coordinate transformation in coordinate transforming section 402 only in the U'-axis direction. Combination section 405 combines the processed camera distance map information and processed radar distance map information to generate "combined map information."

Such a process allows smoothing only in the parallax-axis direction to reduce negative characteristics of the camera distance map information (namely, less accurate distance information than that of the radar distance map information) and to enhance positive characteristics (namely, better recognition of the boundary of an object in the azimuth direction than that of the radar distance map information). Furthermore, the process allows smoothing only in the U'-axis direction to reduce negative characteristics of the radar distance map information (namely, less accurate recognition of the boundary of an object in the azimuth direction than that of the camera distance map information) and to enhance positive characteristics (namely, more accurate distance information than that of the camera distance map information). The accuracy of the object detection can be improved by combined information having enhanced positive characteristics of both camera distance and radar distance map information.

(Embodiment 3)

In Embodiment 2, information processing section 403 smoothes the entire region defined by parallax values and U' included in the camera distance map information. Information processing section 404 smoothes the entire region defined by parallax values and U' included in the radar distance map information. In Embodiment 3, the region defined by U' and parallax values is divided into subregions on the basis of the type of an object having a high frequency of appearance, and the length of the smoothing filter is adjusted for each subregion.

(Configuration of Detection Apparatus 700)

Figure 14:
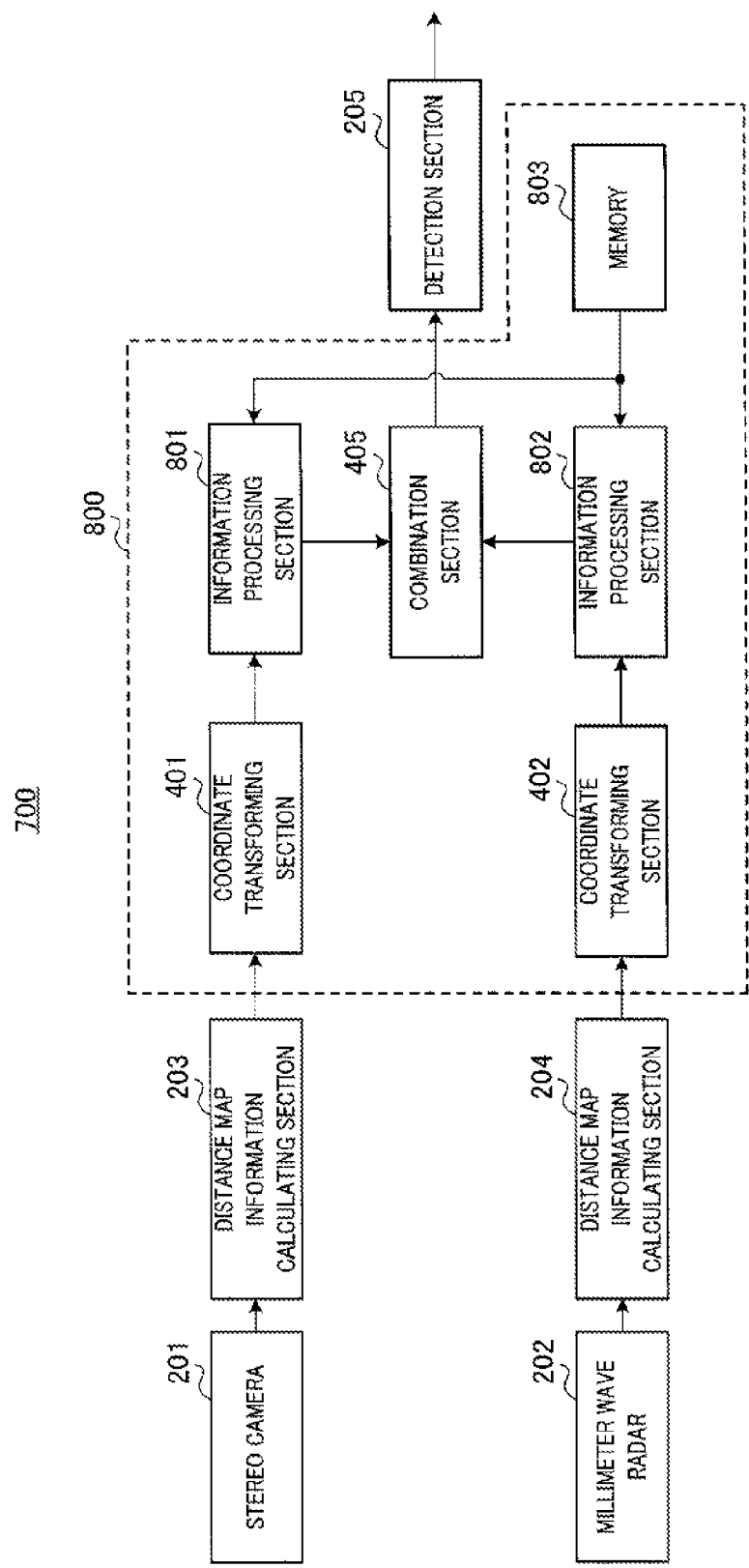
FIG. 14 is a block diagram illustrating the configuration of a detection apparatus in accordance with Embodiment 3 of the present invention.

FIG. 14 illustrates the configuration of detection apparatus 700 in accordance with Embodiment 3 of the present invention. Detection apparatus 700 in FIG. 14 includes positioning information forming apparatus 800.

In FIG. 14, positioning information forming apparatus 800 includes information processing section 801 and 802, and memory 803.

Memory 803 holds area designation information. The term "area designation information" indicates the subregions (occasionally, referred to as "subregions of the objects"), into which the region defined by the parallax values and U included in the camera distance and the radar distance map information are divided on the basis of the type of the object having a high frequency of appearance. If detection apparatus 700 is installed at a place such as a pedestrian crossing or a traffic intersection, the area designation information includes a subregion where vehicles are mainly detected (occasionally, referred to as "a vehicle subregion") and a subregion where pedestrians are mainly detected (occasionally, referred to as "a pedestrian subregion").

Information processing section 801 has the same function as information processing section 403. Information processing section 801, however, adjusts the length of the smoothing filter for individual subregions of the objects indicated by the area designation information held in memory 803. Specifically, information processing section 801 adjusts the length of the smoothing filter to the average size of the vehicle shot in the vehicle subregion, and to the average size of the pedestrian in the pedestrian subregion. In other words, the length of the filter used in a vehicle subregion is larger than that in a pedestrian subregion.

Alternatively, information processing section 801 may adjust the weight of the filter for individual subregions of the object.

Information processing section 802 has the same function as information processing section 404. Information processing section 802, however, adjusts the length of the smoothing filter for individual subregions of the object indicated by the area designation information held in memory 803. Specifically, information processing section 802 adjusts the length of the smoothing filter to the average size of the vehicle shot in the vehicle subregion and to the average size of the pedestrian in the pedestrian subregion. In other words, the length of the filter used in a vehicle subregion is larger than that in a pedestrian subregion.

Alternatively, information processing section 802 may adjust the weight of the filter for individual subregions of the object.

(Operation of Detection Apparatus 700)

Figure 16:
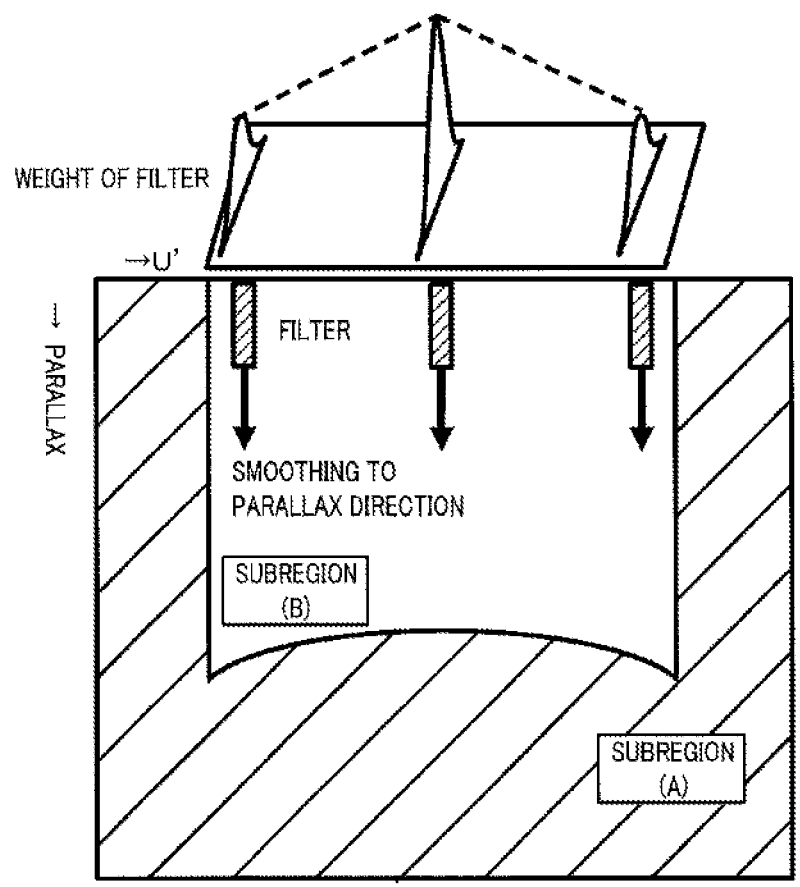
FIG. 16 is a schematic view illustrating a smoothing process for a vehicle subregion in camera distance map information.

The operation of detection apparatus 700 having the above-mentioned configuration will now be explained with particular emphasis on the information processes in positioning information forming apparatus 800. FIG. 15 is a table illustrating information processes for subregions of the objects and FIG. 16 is a schematic view illustrating a smoothing process for a vehicle subregion in camera distance map information.

(Information Processes 1)

Information processing section 801 performs the smoothing, level adjustment, and normalization of the camera distance map information after the coordinate transformation in coordinate transforming section 401. The level adjustment and normalization are the same as that in Embodiment 2, and explanations thereof are omitted.

(Smoothing)

Information processing section 801 smoothes the camera distance map information after the coordinate transformation in coordinate transforming section 401. Information processing section 801 performs the smoothing only in the parallax-axis direction. Information processing section 801 adjusts the length λc of the smoothing filter to the average size of the vehicle shot in the vehicle subregion, and to the average size of the pedestrian in the pedestrian subregion. In other words, as illustrated in FIG. 15, information processing section 802 adjusts the length λc of the filter to long one in a vehicle subregion (in FIG. 15, subregion (B)) and short one in a pedestrian subregion (in FIG. 15, subregion (A)).

Information processing section 801, as illustrated in FIG. 15, uses the weight of the filter in a vehicle subregion (in FIG. 15, subregion (B)), but does not use the weight of the filter in a pedestrian subregion (in FIG. 15, subregion (A)). Specifically, information processing section 801 adjusts the weight of the filter such that, as illustrated in FIG. 16, the maximum weight is attained in the center of the region and the weight monotonously decreases toward the boundaries in a vehicle subregion.

(Information processes 2)

Information processing section 802 performs the smoothing, level adjustment, and normalization of the radar distance map information after the coordinate transformation in coordinate transforming section 402. The level adjustment and normalization are the same in Embodiment 2, and explanations thereof are omitted.

(Smoothing)

Information processing section 802 smoothes the radar distance map information after the coordinate transformation in coordinate transforming section 402. Information processing section 802 performs the smoothing only in the U'-axis direction. Information processing section 802 adjusts the length λr of the smoothing filter to the average size of the vehicle shot in the vehicle subregion, and to the average size of the pedestrian in the pedestrian subregion. In other words, as illustrated in FIG. 15, information processing section 802 adjusts the length λr of the filter to long one in a vehicle subregion (in FIG. 15, subregion (B)) and short one in a pedestrian subregion (in FIG. 15, subregion (A)).

Information processing section 801, as illustrated in FIG. 15, uses the weight of the filter in a pedestrian subregion (in FIG. 15, subregion (A)), but does not use the weight of the filter in a vehicle subregion (in FIG. 15, subregion (B)). The weight of the filter used is increased by a conventional equation.

The objects to be detected have different between reflection intensity characteristics and parallax characteristics depending on the types thereof. FIG. 17 is an illustration of reflection intensity characteristics on objects of interest which are a sideways vehicle and a pedestrian. FIG. 17A illustrates an image of a sideways vehicle, while FIG. 17B illustrates an image of a pedestrian. FIG. 17C illustrates the reflection intensity of the objects in FIGS. 17A and 17B. In FIG. 17C, Peak P1001 is the peak of the reflection intensity of the vehicle, while Peak P1002 is the peak of the reflection intensity of the pedestrian. As seen in FIG. 17C, Peak P1002 is significantly smaller than Peak P1001. This indicates that the reflection cross-sectional area of the pedestrian is smaller than that of the vehicle due to the uneven surface of the pedestrian.

Figure 18A:
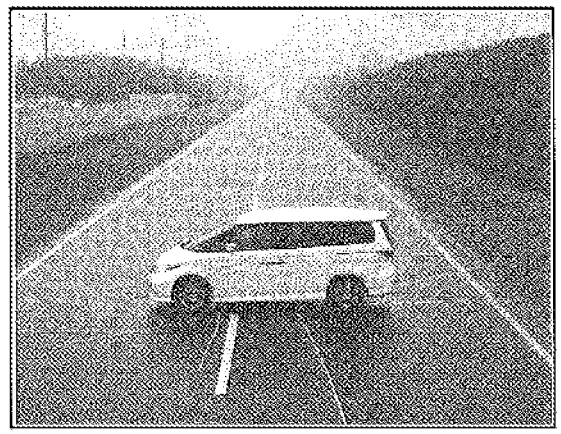
FIG. 18 is an illustration of changes in brightness characteristics on a vehicle image.
Figure 18B:
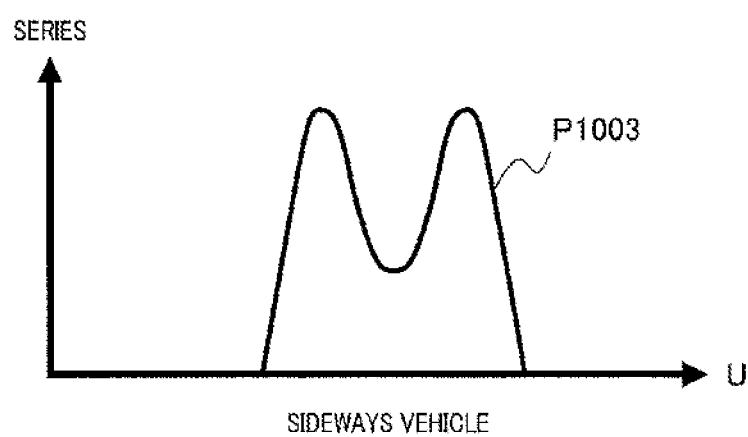

In camera distance map information, unlike the reflection intensity characteristics, there is no large difference between a vehicle and a pedestrian. FIG. 18, however, demonstrates that satisfactory parallax cannot be obtained from the image of the central portion of the sideways vehicle due to small changes in brightness (see, Peak P1003).

Figure 19:
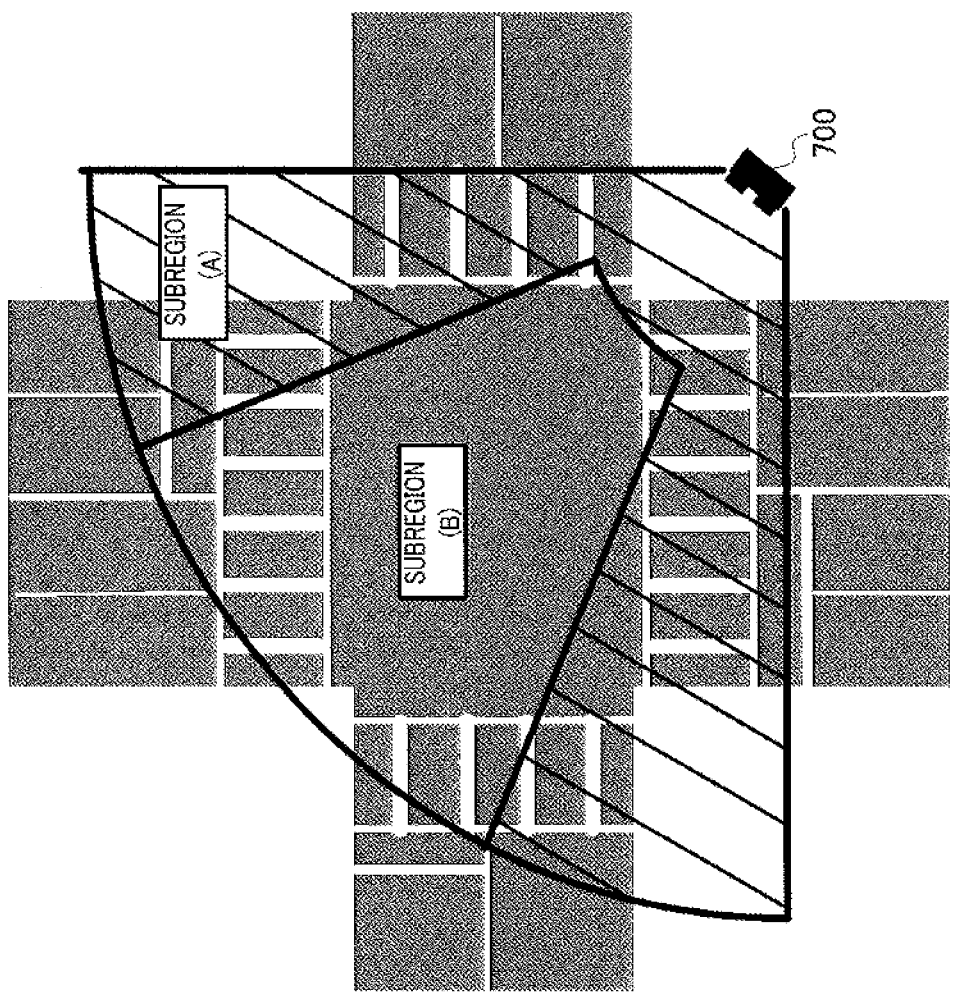
FIG. 19 is an illustration of vehicle and pedestrian areas.

The frequencies of appearance of the vehicle and the pedestrian differ according to area. As illustrated in FIG. 19, detection apparatus 700 installed at the traffic intersection can barely detects pedestrians in the central area of the traffic intersection, but detects on the pedestrian crossing and sidewalks. Consequently, the traffic crossing area, as illustrated in FIG. 19, can be classified into a vehicle subregion (in FIG. 19, subregion (B)) and a pedestrian subregion (in FIG. 19, subregion (A)).

Object detection accuracy depends on the degree of matching between the object to be detected and the length of the smoothing filter.

In this embodiment, information processing sections 801 and 802 adjust the length and weight of the smoothing filter for individual subregions of the objects indicated by the area designation information held by memory 803. This operation can reduce the probability of erroneous detection of an object. In particular, the adjustment of the length of the filter can reduce erroneous detection of a plurality of pedestrians as a single pedestrian or a single vehicle as a plurality of vehicles. In addition, the smoothing using the weight of the filter illustrated in FIG. 16 can reduce erroneous detection of a single vehicle as a plurality of vehicles.

Area designation information may be generated by an operator of detection apparatus 700 in a way that pedestrian subregions and vehicle subregions are selected using a detection apparatus 700-installation map appearing on an display apparatus (not illustrated). Alternatively, the area designation information may be calculated based on the map information including the area information and on the information about the locations of installation of detection apparatus 700.

(Other Embodiments)

(1) In each of the embodiments described above, the millimeter wave radar includes an antenna having a narrow-width beam in a direction parallel to the road surface. The reflected waves are detected with the antenna mechanically rotating parallel to the road surface. The antenna may have a narrow beam width in the direction perpendicular to the road surface. In such a case, the antenna is mechanically moved parallel and perpendicularly to the road surface to acquire the same radar distance map information as in the embodiments described above, attaining the object of the present invention. This technique can also be applied to a radar having an antenna with a narrower beam width, such as a laser radar, than that of a millimeter wave radar.

(2) Unlike the embodiments described above, software associated with the hardware can also be used to attain the object of the present invention, instead of sole use of the hardware.

Each functional block in the embodiment described above is typically integrated in the form of LSI. Individual functional blocks may be independently integrated into single chips, or a part or all the functional blocks may be integrated into a single chip. LSI may be referred to as IC, system LSI, super LSI, or ultra LSI according to the degree of integration.

Any other approach for integration of the circuits, such as a dedicated circuit or a general purpose processor, can also be employed instead of the LSI. Other methods may also be used, such as FPGA (field programmable gate array) which can be programmed after the production of LSI or a reconfigurable processor in which the connection or arrangement of circuit cells in the LSI can be reconfigured.

The functional blocks will be integrated by a new technology substituting for LSI as a result of the progress in semiconductor technology or derivative technology in the field of integrated circuit configuration. Application of biotechnology is a possible alternative.

The entire disclosure of the specifications, drawings and abstracts in Japanese Patent Application No 2011-013174 filed on Jan. 25, 2011 is incorporated herein by reference.

INDUSTRIAL APPLICABILITY

A positioning information forming apparatus, a detection apparatus, and a positioning information forming method in accordance with the present invention are useful for improving object detection accuracy.

REFERENCE SIGNS LIST 100, 400, 800 Positioning information forming apparatus
101, 401, 402 Coordinate transforming section
102, 403, 404, 801, 802 Information processing section
103, 405 Combination section
200, 300, 700 Detection apparatus
201 Stereo camera
202 Millimeter wave radar
201, 204 Distance map information calculating section
205 Detection section
411, 421 Smoothing section
412, 422 Level adjusting section
413, 423 Normalization section
803 Memory

The invention claimed is:

1. A positioning information forming apparatus that forms positioning information used for detection of an object on the basis of an image based on information detected by a radar, and on an image taken by a stereo camera, comprising;
a first coordinate transforming section that transforms a coordinate system of radar distance map information associating a coordinate group of the image based on the information with distance information, into a reference coordinate system defined by a parallax-axis and one of the coordinate axes of an image plane coordinate system at a virtual position of installation of the positioning information forming apparatus;
a first smoothing section that smooths the transformed radar distance map information by applying a first smoothing filter only in the one of the coordinate axes direction;
a second coordinate transforming section that transforms a coordinate system of camera distance map information associating a coordinate group of the taken image with distance information, into a reference coordinate system;
a second smoothing section that smooths the transformed camera distance map information by applying a second smoothing filter only in the parallax-axis direction; and
a combination section that forms combined map information by combining the smoothed radar distance map information and the smoothed camera distance map information.

2. The positioning information forming apparatus according to claim 1, further comprising:
a first level adjusting section that adjusts a level of the smoothed radar distance map information by multiplying the smoothed radar distance map information by a first level filter;
a second level adjusting section that adjusts a level of the smoothed camera distance map information by multiplying the smoothed camera distance map information by a second level filter;
wherein the first level filter and the second level filter have a shape indicating a monotonous decrease of a level value of filter with an increase of a parallax value, and the level value of the first level filter is larger than the level value of the second level filter.

3. The positioning information forming apparatus according to claim 1, wherein the first smoothing section and the second smoothing section receive area designation information indicating a vehicle subregion where a vehicle is mainly detected and a pedestrian subregion where a pedestrian is mainly detected within a region defined by the one of the coordinate axes and the parallax, and adjust a length of the filter in the vehicle subregion to be larger than a length of the filter in the pedestrian subregion.

4. The positioning information forming apparatus according to claim 3, wherein the second smoothing section adjusts a weight of the filter such that maximum weight is attained at a central portion of the region and the weight monotonously decreases toward the boundaries in the vehicle subregion.

5. The positioning information forming apparatus according to claim 1, wherein the reference coordinate system is a coordinate system of the camera map information.

6. An objection detection apparatus, comprising the positioning information forming apparatus according to claim 1.

7. The positioning information forming apparatus according to claim 1, wherein an image plane coordinate system in the reference coordinate system is an image plane coordinate system at a virtual position of installation of the positioning information forming apparatus installed on a road surface.

8. A method for forming positioning information used for detection of an object on the basis of an image based on information detected by a radar, and on an image taken by a stereo camera, comprising;
transforming a coordinate system of radar distance map information associating a coordinate group of the image based on the information with distance information, into a reference coordinate system defined by a parallax-axis and one of the coordinate axes of an image plane coordinate system at a virtual position of installation of a positioning information forming apparatus in a first coordinate transforming section;
smoothing the transformed radar distance map information by applying a first smoothing filter only in the one of the coordinate axes direction in a first smoothing section;
transforming a coordinate system of camera distance map information associating a coordinate group of the taken image with distance information, into a reference coordinate system in a second coordinate transforming section;
smoothing the transformed camera distance map information by applying a second smoothing filter only in the parallax-axis direction in a second smoothing section; and
forming combined map information by combining the smoothed radar distance map information and the smoothed camera distance map information in a combination section.

9. The positioning information forming apparatus according to claim 1, wherein the information detected by the radar is different from the information of the image taken by the stereo camera.

10. The positioning information forming apparatus according to claim 1, wherein the radar is different from the stereo camera.

11. The positioning information forming method according to claim 8, wherein the information detected by the radar is different from the information of the image taken by the stereo camera.

12. The positioning information forming method according to claim 8, wherein the radar is different from the stereo camera.

* * * * *